Patented Mar. 11, 1924.

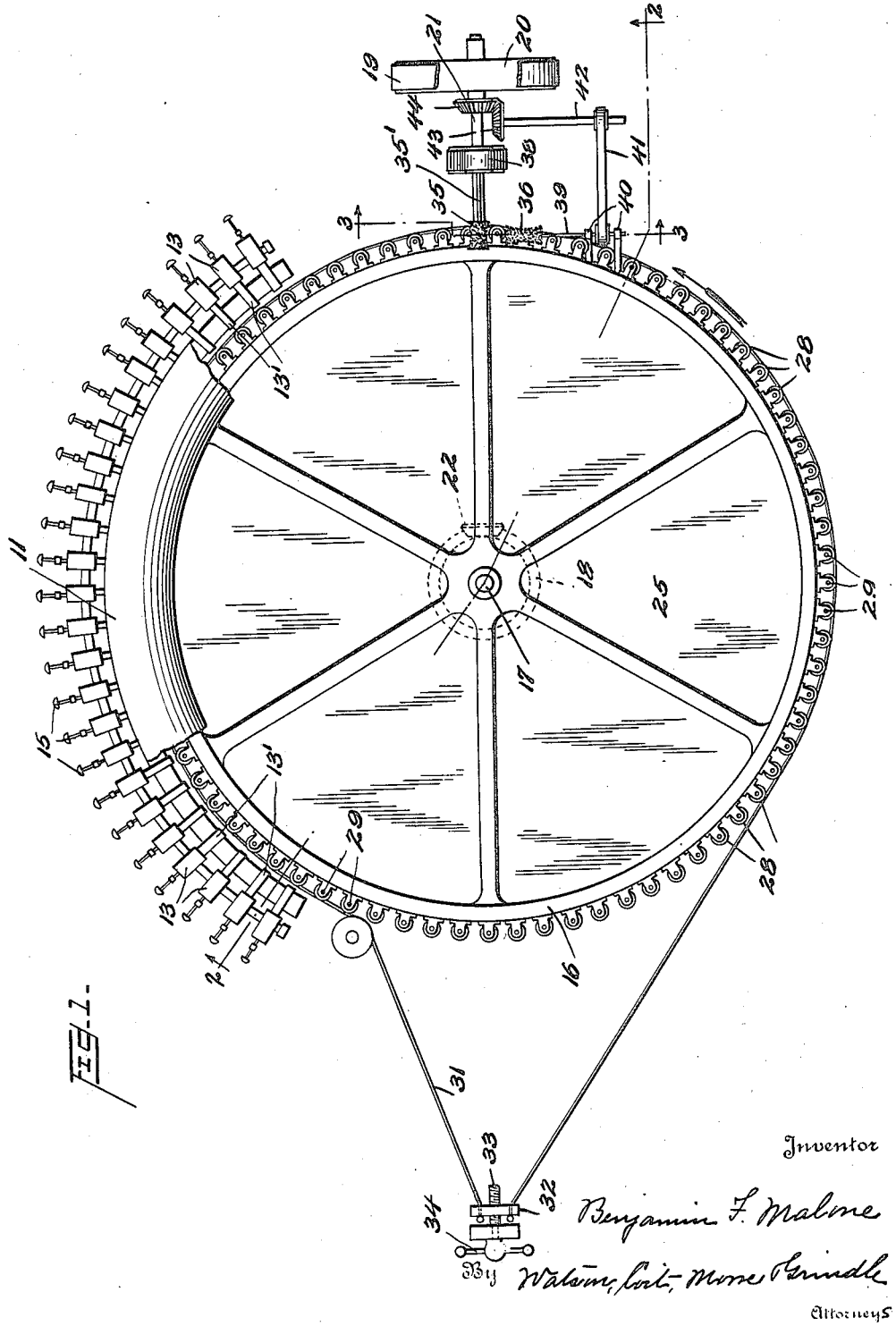

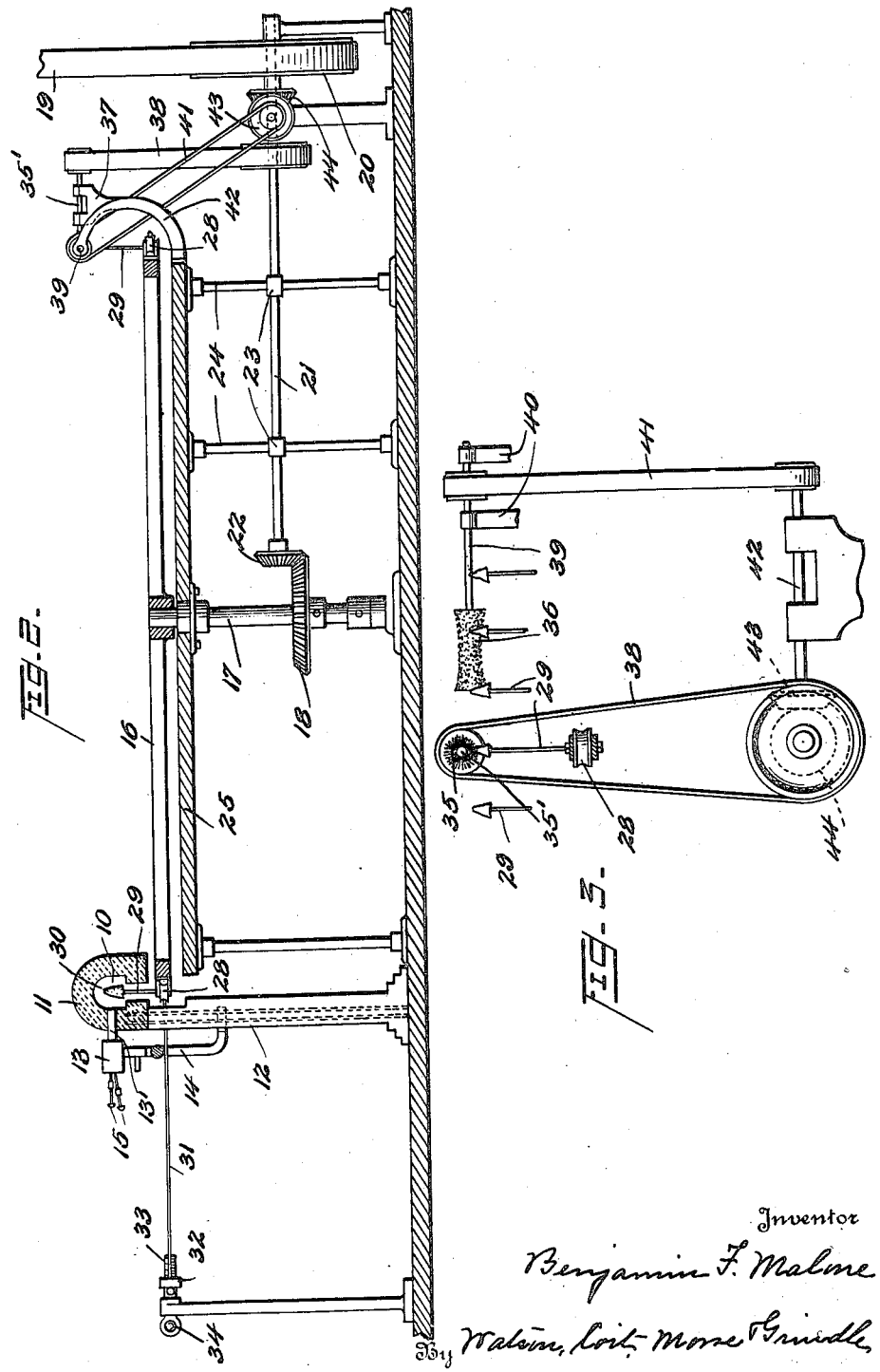

1,486,351

UNITED STATES PATENT OFFICE.

BENJAMIN F. MALONE, OF MONTICELLO, GEORGIA.

VEGETABLE AND FRUIT ROASTING AND CLEANING MACHINE.

Application filed October 15, 1921. Serial No. 508,016.

*To all whom it may concern:*

Be it known that I, BENJAMIN F. MALONE, a citizen of the United States, and resident of Monticello, county of Jasper, State of Georgia, have invented certain new and useful Improvements in Vegetable and Fruit Roasting and Cleaning Machines, of which the following is a specification.

The present invention relates to apparatus for roasting and cleaning vegetables and fruits.

It is the object of the invention to provide an apparatus of this class, by means of which fruits and vegetables, particularly pimento peppers may be thoroughly and evenly roasted and thoroughly cleaned in large quantities, with a minimum of attention and labor on the part of an attendant. The invention may be embodied in various forms, one of which is illustrated in the accompanying drawings, in which—

Figure 1 is a plan view of the apparatus partly broken away to show details;

Figure 2 is a section on line 2—2 of Figure 1; and

Figure 3 is a section on line 3—3 of Figure 1.

An open-ended nearly semi-circular heating chamber is indicated at 10 in the drawings, this chamber being formed in the arc-shaped furnace structure 11 having a cross section resembling an inverted U (being open at the bottom). The structure 11 is supported upon a pedestal or wall 12, and the chamber 10 is adapted to be heated by the flames from a plurality of gas burners 13, supported by means of brackets 14 on the outer side of the furnace, and having flame conducting tubes 13' extending inwardly. Each of these burners is provided with adjusting handles 15 for regulating the flame and by means of which the temperature of the heating chamber may be varied along its length, as desired. The temperature may be maintained the same from end to end of the heating chamber, or one portion may be heated to a higher temperature than the others.

A carrier in the form of a horizontally disposed wheel is indicated at 16, this carrier being secured to the top of a vertically disposed axle 17 which also carries a bevel gear 18. The carrier is adapted to be rotated by power means, as, for instance, by a motor which is operatively connected thereto by means of belt 19, belt wheel 20 secured on shaft 21, and pinion 22 also secured on this shaft and meshing with bevel gear 18. Shaft 21 is rotatably supported in bearings 23 which are fastened to legs 24 of the circular table 25 which underlies the carrier wheel.

Rotatably secured to the periphery of the carrier wheel are a plurality of pulleys 28 and extending axially upward from each of these pulleys is a spindle 29 which comprises a member for supporting one of the articles to be roasted and brushed. The spindles are formed to receive upon their upper ends the peppers 30 or similar fruit or vegetables and as the carrier is rotated, the spindles and peppers pass through the chamber 10 which is heated to such a temperature that the peppers emerging therefrom are thoroughly roasted in the desired manner.

In order to effect the rotation of the peppers as they pass through the heating chamber, so that all sides are equally subjected to the direct heat of the burners, a stationary rope or belt 31 is provided, the ends of which are secured to a block 32 and which extends around the periphery of the carrier, lying in the grooves of pulleys 28. As this rope is stationary at all times and the carrier revolves, it is apparent that the pulleys 28 and spindles 29 will rotate so that all portions of the outer surfaces of the peppers or other articles will be subjected for the same length of time to the direct heat of the gas torches. An adjusting screw 33 has threaded engagement with block 32 and by manipulating the handle 34 of this screw any looseness or slack of the cable may be taken up.

It is desirable to brush the articles thoroughly, and for this purpose two rotatable brushes 35 and 36 are provided, as clearly shown in Figure 3. The brush 35 is positioned to brush the tops of the rotating peppers as they pass, and the brush 36 is positioned to brush the sides of the peppers. Rotation of the peppers enables the last mentioned brush to effectively clean the peppers on all sides as they pass. Brush 35 is fixed on a shaft 35' rotatably supported on a bracket 37 extending upwardly from table 25. The brush shaft 35' is driven by a belt 38 from the main shaft 21. Brush 36 is mounted on a rotatable shaft 39 supported in brackets 40 which extend upwardly from table 25 and shaft 39 is also connected by means of belt 41, shaft 42 and bevel gears 43 and 44 with main shaft 21.

In the operation of the apparatus above described, an attendant will place the peppers, after they have been seeded, on the ends of the spindles, as the spindles pass successively in front of him in the rotation of the carrier. The peppers, after being cleaned and roasted, are brought back to the starting point where they are removed and fresh unroasted peppers placed in position. This process may be kept up indefinitely. The operation of the apparatus is rapid and enables an attendant to roast and clean a large number of peppers in a short time. Furthermore, they are uniformly roasted throughout and each pepper is submitted to exactly the same roasting action, thus insuring a uniform product.

The design and arrangement of the parts of the invention may be varied without departing from its scope, which is indicated in the appended claims.

Having thus described my invention what is claimed as new and desired to be secured by Letters Patent is:

1. In a device of the class described, in combination, a heating chamber, a plurality of independently regulatable heating devices for heating said chamber, said devices being arranged longitudinally of the chamber, whereby the temperature of the chamber may be varied along its length, a rigid carrier, a plurality of rotatable articles supporting members mounted on said carrier, means for moving said carrier to cause said members to pass successively through said heating chamber, and means for rotating said members.

2. In a device of the class described, in combination, a carrier, a plurality of article supporting members rotatably mounted on said carrier, a cleaning brush mounted for rotation about a fixed axis, means for moving said carrier and rotating said brush, and stationary means for engaging said article supporting members to effect rotation thereof as the carrier moves whereby an article suported on one of said members will be rotated to be cleaned on all sides as it passes the brush.

3. A device of the class described, including in combination, a carrier, a plurality of article holders on said carrier adapted to be rotated when the carrier is moved, a cleaning brush rotatable about a fixed axis for brushing said articles, and common means for moving the carrier and rotating the brush.

4. A device of the class described, including in combination, a carrier, a plurality of article holding devices rotatably supported on said carrier, a heating chamber, a cleaning brush mounted for rotation about a fixed axis, and common means for moving said carrier and rotating said brush, whereby articles carried on said members will be roasted and brushed while being rotated.

5. In a device of the class described, in combination, an open ended arcuate heating chamber, a plurality of rotatable article holding members, and rigid means for moving said members successively through said heating chamber and simultaneously rotating said members.

6. In a device of the class described, in combination, a carrier, a plurality of article holders rotatably mounted in the carrier, means for rotating the holders when the carrier is moved, a brush rotatable about an axis substantially parallel to the path of the holders, a second brush rotatable about an axis transverse to the path of the holders, means for moving the carrier and means for rotating the brushes.

7. In a device of the class described, in combination, an open-ended roasting chamber, a carrier, a plurality of article holders rotatably mounted on the carrier, means for rotating the holders when the carrier is moved, the carrier being adapted to convey the article holders through said roasting chamber, a brush rotatable about an axis substantially parallel to the path of the holders, a second brush rotatable about an axis transverse to the path of the holders, means for moving the carrier and means for rotating the brushes.

In testimony whereof I hereunto affix my signature.

BENJAMIN F. MALONE.